US012723160B2

(12) United States Patent
Robertson et al.

(10) Patent No.: US 12,723,160 B2
(45) Date of Patent: Sep. 1, 2026

(54) LIQUID APPLIED SOUND DAMPENING COMPOSITION

(71) Applicants: Dow Global Technologies LLC, Midland, MI (US); Rohm and Haas Company, Collegeville, PA (US)

(72) Inventors: Ian D. Robertson, Collegeville, PA (US); Michael W. Leonard, Collegeville, PA (US); Ray E. Drumright, Midland, MI (US); James C. Bohling, Lansdale, PA (US)

(73) Assignees: Rohm and Haas Company, Collegeville, MI (US); Dow Global Technologies LLC, Midland, MI (US)

( * ) Notice: Subject to any disclaimer, the term of this patent is extended or adjusted under 35 U.S.C. 154(b) by 568 days.

(21) Appl. No.: 18/256,664

(22) PCT Filed: Nov. 19, 2021

(86) PCT No.: PCT/US2021/059998

§ 371 (c)(1),
(2) Date: Jun. 9, 2023

(87) PCT Pub. No.: WO2022/132383

PCT Pub. Date: Jun. 23, 2022

(65) Prior Publication Data

US 2024/0043700 A1 Feb. 8, 2024

Related U.S. Application Data

(60) Provisional application No. 63/125,095, filed on Dec. 14, 2020.

(51) Int. Cl.

| | |
|---|---|
| ***C09D 5/02*** | (2006.01) |
| ***C09D 7/45*** | (2018.01) |
| ***C09D 7/61*** | (2018.01) |
| ***C09D 7/65*** | (2018.01) |
| ***C09D 133/10*** | (2006.01) |

(52) U.S. Cl.
CPC ............ *C09D 5/022* (2013.01); *C09D 5/028* (2013.01); *C09D 7/45* (2018.01); *C09D 7/61* (2018.01); *C09D 7/65* (2018.01); *C09D 133/10* (2013.01)

(58) Field of Classification Search
CPC . C09D 5/022; C09D 7/65; C09D 7/61; C09D 7/45; C09D 5/028; C09D 133/10
USPC ........................................................... 524/53
See application file for complete search history.

(56) References Cited

U.S. PATENT DOCUMENTS

| | | | |
|---|---|---|---|
| 8,623,463 B2 | 1/2014 | Fonseca et al. | |
| 9,080,040 B2 | 7/2015 | Fonseca et al. | |
| 10,233,348 B2 | 3/2019 | Cai et al. | |
| 10,865,314 B2 | 12/2020 | Namimoto et al. | |
| 2012/0043493 A1 | 2/2012 | Fonseca et al. | |
| 2014/0251563 A1* | 9/2014 | Lawrenz ................ | D21H 17/36 524/427 |
| 2015/0218404 A1* | 8/2015 | Bowles .................... | C09D 5/02 252/62 |
| 2019/0106512 A1 | 4/2019 | Baikerikar et al. | |
| 2019/0315997 A1* | 10/2019 | Cui .......................... | C08K 5/52 |
| 2022/0298365 A1* | 9/2022 | Gu .......................... | C09D 5/028 |

FOREIGN PATENT DOCUMENTS

| | | |
|---|---|---|
| WO | 2013068363 | 5/2013 |
| WO | 2018102331 | 6/2018 |
| WO | 2018112691 | 6/2018 |
| WO | 2019023845 | 2/2019 |

* cited by examiner

*Primary Examiner* — Robert S Jones, Jr.
*Assistant Examiner* — Elizabeth Amato

(57) ABSTRACT

The present invention relates to a composition comprising an aqueous dispersion of acrylic polymer particles; paraffin wax; graphite particles; and extender particles. The composition is useful for making coatings with low water pickup for liquid applied sound damping applications.

10 Claims, No Drawings

LIQUID APPLIED SOUND DAMPENING COMPOSITION

BACKGROUND OF THE INVENTION

The present invention relates to a composition suitable for liquid applied sound damping applications, more particularly, a composition that forms a coating with excellent water resistance.

Damping materials are used to mitigate vibration in rigid structures to reduce noise. In motor vehicles, two major vibration damping technologies dominate: bitumen pads and liquid applied sound damping (LASD) coatings derived from waterborne latexes. Bitumen pads, a low-cost alternative widely used in the 20$^{th}$ century, exhibit relatively poor damping performance and require laborious manual application. LASD coatings, on the other hand, have gained significant market share because they may be rapidly applied by robotic spray techniques. Moreover, LASD coatings exhibit better damping properties, environmental, health, and safety (EH&S) profiles, and lower densities. Together, these benefits have led automotive OEMs to increasingly employ LASD for noise vibration and harshness (NVH) management over the incumbent bitumen pads. WO 2018/062546 A1 describes aqueous dispersions of polymer particles suitable for vibration damping applications. Although improved suppression of blistering is reported, water resistance is not described. There is still a need in the art to develop LASD coatings with excellent water resistance comparable to that of bitumen pads. Water-resistant LASD coatings would likely facilitate adoption of this technology with customers. Additionally, improved water resistance could allow LASD coatings to be used in new application areas, such as inside the wheel wells of a vehicle. It would therefore be an advance in the art to develop an aqueous dispersion of polymer particles that may be formulated into an LASD coating that is water resistant, exhibits an excellent appearance, and maintains high vibration damping performance.

SUMMARY OF THE INVENTION

The present invention addresses a need in the art by providing a composition comprising an aqueous dispersion of acrylic polymer particles having a z-average particle size in the range of from 50 nm to 500 nm, and a calculated $T_g$ in the range of from −25° C. to 30° C.; paraffin wax; extender particles; and a rheology modifier; wherein the pigment volume concentration of the composition is in the range of from 40 to 70; wherein the composition has a Brookfield viscosity in the range of from 200,000 cP to 20,000,000 cP when not under shear conditions. The composition of the present invention is useful for reducing water uptake in coatings for LASD applications.

DETAILED DESCRIPTION OF THE INVENTION

The present invention is a composition comprising an aqueous dispersion of acrylic polymer particles having a z-average particle size in the range of from 50 nm to 500 nm, and a calculated $T_g$ in the range of from −25° C. to 30° C.; paraffin wax; extender particles; and a rheology modifier wherein the pigment volume concentration of the composition is in the range of from 40 to 70; wherein the composition has a Brookfield viscosity in the range of from 200,000 cP to cP when not under shear conditions.

As used herein, the term acrylic polymer particles (alternatively, acrylic latex particles) refers to acrylic or styrene-acrylic polymer particles. The polymer particles are preferably film-forming at ambient temperature; accordingly, the polymer particles preferably have a $T_g$, as calculated by the Fox equation, of not greater than 30° C., preferably not greater than 20° C., and more preferably not greater than 5° C.; and not less than −25° C., more preferably not less than −10° C. Preferably, the polymer particles comprise structural units of methyl methacrylate (MMA, $T_g$=105° C.) or styrene (STY, $T_g$=100° C.), and at least one monomer selected from the group consisting of ethyl acrylate (EA, $T_g$=−22° C.), butyl acrylate (BA, $T_g$=−54° C.), 2-ethylhexyl acrylate (2-EHA, $T_g$=−70° C.), and 2-propylheptyl acrylate (2-PHA. $T_g$=−68° C.).

The term "structural unit" is used herein to describe the remnant of the recited monomer after polymerization. For example, a structural unit of MMA is as illustrated:

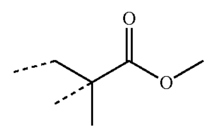

structural unit of MMA where the dotted lines represent the points of attachment of the structural unit to the polymer backbone.

The polymer particles preferably comprise from 0.1, more preferably from 0.2, and most preferably from 0.3 weight percent, to 6, more preferably to 4, and most preferably to 3 weight percent structural units of an ethylenically unsaturated acid monomer such as a carboxylic acid monomer and a phosphorus acid monomer. Examples of suitable carboxylic acid monomers include acrylic acid, methacrylic acid, and itaconic acid; examples of suitable phosphorus acid monomers include a phosphonate or dihydrogen phosphate ester of an alcohol in which the alcohol contains or is substituted with a polymerizable vinyl or olefinic group. Preferred dihydrogen phosphate esters are phosphates of hydroxyalkyl acrylates or methacrylates, including phosphoethyl methacrylate (PEM) and phosphopropyl methacrylates.

The concentration of polymer particles is preferably in the range of from 10 to 25 weight percent, based on the weight of the composition. The acrylic polymer particles preferably have a z-average particle size in the range of from 80 nm to 250 nm, as measured by dynamic light scattering. In one aspect, the acrylic polymers have a number average molecular weight in the range of from 10,000 to 40,000 g/mol as measured by gel permeation chromatography detailed hereinbelow.

Paraffin wax is a polyethylene with from 10 to 40 ethylene repeat units:

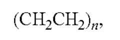

$(CH_2CH_2)_n$, where n is from 10 to 40. The concentration of the paraffin wax is preferably in the range of from 1, more preferably from 2, and most preferably from 3 weight percent, to preferably 15, more preferably to 10 weight percent, based on the weight of the polymer particles. Commercial examples of suitable paraffin waxes include Michem emulsion 47950, Michem lube 723, and Aquacer emulsion 593, which are paraffin wax aqueous emulsions stabilized with a nonionic surfactant.

The composition may further comprise a higher molecular weight (150 to 1500 repeat units) polyethylene (PE) or polypropylene (PP) wax. The concentration of the higher molecular weight PE or PP, if used at all, is preferably in the range of from 5 to 35 weight percent, based on the weight of paraffin wax and the higher molecular weight polyethylene or polypropylene wax. Commercial examples of paraffin wax/PE blend emulsions include Michem 62330 and Michem 66035 paraffin wax/PE wax blend emulsions.

The composition further comprises extender particles, which typically have a median diameter average ($D_{50}$) particle size in the range of from 1 μm to 50 μm. Examples of suitable extenders, also referred to in the art as fillers, include calcium carbonate; silica; alumina; kaolin; clay; talc; graphite; mica; diatomaceous earth; glass powder, fibers, or microspheres; aluminum hydroxide; perlite; barium sulfate; magnesium carbonate; calcium dihydrate; rock wool; Wollastonite; zeolite; ceramic and thermoplastic microspheres; polymeric fibers, and crosslinked rubber particles. The pigment volume concentration (PVC) of the composition is in the range of from preferably from 50, to 70, preferably to 65. PVC is calculated using the following formula:

$$PVC = \left[\frac{Vol\ (\text{Pigment} + \text{Extender})}{Vol\ (\text{Pigment} + \text{Extender} + \text{Binder Solids}}\right] \times 100$$

where pigment refers to an opacifying pigment such as titanium dioxide, zinc oxide and zirconium oxide; and binder solids refers to the contribution of polymer from the aqueous dispersion of the polymer particles that bind the opacifying pigment and extender particles together. The composition preferably comprises less than 5 PVC, more preferably 0 PVC of an opacifying pigment. The composition advantageously includes other additives such as rheology modifiers, defoamers, surfactants, and potato starch.

As the following examples demonstrate, coatings arising from the composition of the present invention show a marked reduction in water sensitivity, which is particularly of interest in LASD applications.

Gel Permeation Chromatographic Method of Measuring $M_n$ of Polymer Particles

GPC samples were prepared in THF at a concentration of 5 mg/mL based on the polymer solids content. The sample solutions were kept on a flatbed shaker at room temperature overnight, then filtered through a 0.45 μm PTFE filter (Whatman) prior to GPC analysis. The GPC instrument setup consisted of an Agilent 1200 series HPLC system (degasser, pump, autosampler), and a Wyatt T-rEX refractive index detector. The polymer separation was carried out on a column set that consisted of one TOSOH TSKgel $GMH_{xl}$-L and one TOSOH TSKgel G50001-$H_{xl}$ column (each packed with 9 μm styrene divinylbenzene gels; each dimension: 7.5 mm ID×30 cm) using THF as the mobile phase at a flow rate of 1 mL/min; the injection volume was 40 μL.

Astra 7 software (Wyatt Technology) was used for data acquisition and processing. $M_n$ and $M_w$ were calculated using a conventional calibration method based on polystyrene standards (Agilent Technology) as shown in Table 1 below:

TABLE 1

| Polystyrene Standard | | |
|---|---|---|
| Peak | PS mixA1 (g/mol) | PSmixB1 (g/mol) |
| 1 | 6,035,000 | 2,698,000 |
| 2 | 597,500 | 290,300 |
| 3 | 126,000 | 69,650 |
| 4 | 30,230 | 9,960 |
| 5 | 2,970 | 580 |

The number- and weight-average molecular weight were obtained based on the polystyrene calibration curve and sample elution profile by equations:

$$M_n = \frac{\sum_{i=1}^{N} h_i}{\sum_{i=1}^{N} (h_i/M_i)}$$

$$M_w = \frac{\sum_{i=1}^{N} (h_i\ M_i)}{\sum_{i=1}^{N} h_i}$$

Where $h_i$ is the GPC curve height at the ith volume increment and the $M_i$ is the molecular weight of the species eluted at the ith retention volume based on polystyrene calibration curve.

Coating formulations containing paraffin wax or blend of paraffin wax and polyethylene were prepared from the components shown in Table 2 in the order listed. The components were mixed with an overhead stirrer for 10 min, then allowed to equilibrate overnight. The waxes were added at 6.4 weight % based on the weight of binder solids. The comparative example, which was prepared without wax (Table 3) used the same formulation, but replaced the wax solids with additional binder solids. Binder refers to a 50.5% solids BA 55/MMA 42/PEM 3 latex with an $M_n$ of ~21,000 g/mol. (PEM has an activity of 60%.) Density refers to dry density. TERGITOL, TAMOL, and ACRYSOL are Trademarks of The Dow Chemical Company or Its Affiliates. Expancel 031 WUF 40 refers to Expancel 031 WUF 40 Thermoplastic Microspheres.

TABLE 2

| Coating Formulation with Wax | | | |
|---|---|---|---|
| Component | Mass (g) | Solids (%) | Density (g/cm$^3$) |
| Binder (BA 55/MMA 42/PEM 3) | 27.04 | 50.5 | 1.1 |
| Wax Emulsion (solids) | 0.87 | 30-50 | 0.9 |
| TAMOL ™ 1254 Dispersant | 0.96 | 35 | 2.1 |
| TERGITOL ™ 15-S-40 Nonionic Surfactant | 0.1 | 50 | 1.2 |
| Bayferrox 318M Colorant | 0.2 | 100 | 4.6 |
| Titan 200 Calcium Carbonate | 66.64 | 100 | 2.7 |
| Kollotex 1500 Potato Starch | 1.82 | 100 | 1.6 |
| Expancel 031 WUF 40 | 0.15 | 76 | 1.0 |
| ACRYSOL ™ RM-12W Rheology Modifier | 0.12 | 19 | 1.27 |
| ACRYSOL ™ TT-615 Rheology Modifier | 0.08 | 30 | 1.23 |

TABLE 3

| Coating Formulation Without Wax | | | |
|---|---|---|---|
| Component | Mass (g) | Solids (%) | Density ($g/cm^3$) |
| Binder (BA 55/MMA 42/PEM 3) | 28.76 | 50.5 | 1.1 |
| TAMOL ™ 1254 Dispersant | 0.96 | 35 | 2.1 |
| TERGITOL ™ 15-S-40 Nonionic Surfactant | 0.1 | 50 | 1.2 |
| Bayferrox 318M Colorant | 0.2 | 100 | 4.6 |
| Titan 200 Calcium Carbonate | 66.64 | 100 | 2.7 |
| Kollotex 1500 Potato Starch | 1.82 | 100 | 1.6 |
| Expancel 031 WUF 40 | 0.15 | 76 | 1.0 |
| ACRYSOL ™ RM-12W | 0.12 | 19 | 1.27 |
| ACRYSOL ™ TT-615 Rheology Modifier | 0.08 | 30 | 1.23 |

Water Uptake Testing

Coatings were drawn down into 4×100×80-mm samples on aluminum panels. The samples were then left at room temperature for 30 min and subsequently baked at 150° C. for 30 min Samples were cooled to room temperature and weighed to determine their total mass. Samples were then immersed in 10 cm of water for 48 h and weighed again. The water uptake was reported as the percentage mass difference between soaked and unsoaked samples.

Table 4 illustrates percent water pickup (% WPU) for coatings (avg. of 3 panels tested after 2 d) with and without paraffin wax. ML 190 refers to Michem Lube 190 Polyethylene Wax Emulsion; Aquacer 593 refers to Aquacer 593 Polypropylene Wax Emulsion; ML 723 refers to Michem Lube 723 Paraffin Wax Emulsion; Aquacer 497 refers to Aquacer 497 Paraffin Wax Emulsion; ME 62330 refers to Michem 62330 Paraffin Wax/PE Wax Blend Emulsion; and ML 270R refers to Michem Lube 270R Paraffin Wax/PE Wax Blend Emulsion.

Brookfield viscosity was measured at 25° C. using a Brookfield RV DV-I+ viscometer with a Brookfield Helipath stand and a T-Bar type T-E spindle for coatings with viscosities between 1,000,000 and 10,000,000 centipoise (cP). A Brookfield T-Bar type T-C and Type T-F spindle may be used for viscosities between 200,000 and 1,000,000 cP, and 10,000,000 and cP, respectively. The speed of rotation of the spindle is 0.5 rpm and the spindle is run for 120 seconds (i.e., under no shear conditions) before the measurement is made. The stand allows the spindle to move down into the coating during rotation to ensure proper measurement of highly viscous materials. Viscosity is measured in centipoise (cP)×$10^4$. Table 4 illustrates water pickup data for the coatings.

TABLE 4

| Water Pickup Results for Coatings | | | | |
|---|---|---|---|---|
| Ex. No. | Wax | % WPU | Std. Dev. | Viscosity |
| Comp. Ex. 1 | No Wax | 21.49% | 0.73% | 450 |
| Comp. Ex 2 | ML 190 | 21.65% | 0.48% | 601 |
| Comp. Ex 3 | Aquacer 593 | 20.63 | 3.3% | 405 |
| Ex. 1 | ML 723 | 7.61% | 0.14% | 888 |
| Ex. 2 | Aquacer 497 | 5.98% | 0.09% | 565 |
| Ex. 3 | ME 62330 | 9.50% | 0.39% | 925 |
| Ex. 4 | ML 270R | 8.83% | 0.93% | 660 |

The data demonstrate no difference in water pickup for a coating prepared from a formulation containing PE wax (Comp. Ex. 2) and a coating prepared from a formulation containing no wax (Comp. Ex. 1). In contrast, a substantial decrease in water uptake is seen for coatings prepared from formulations containing paraffin wax (Ex. 1 and Ex. 2), as well as blends of paraffin and polyethylene waxes (Ex. 3 and Ex. 4).

The invention claimed is:

1. A composition comprising an aqueous dispersion of acrylic polymer particles having a z-average particle size in the range of from 50 nm to 500 nm, and a calculated $T_g$ in the range of from −25° C. to 30° C.; paraffin wax; extender particles; and a rheology modifier; wherein the pigment volume concentration of the composition is in the range of from 40 to 70; and wherein the composition has a Brookfield viscosity in the range of from 200,000 cP to 20,000,000 cP when not under shear conditions.

2. The composition of claim 1 wherein the concentration of acrylic polymer particles is in the range of from 10 to 25 weight percent, based on the weight of the composition; and the concentration of paraffin wax is in the range of from 1 to 15 percent, based on the weight of the acrylic polymer particles.

3. The composition of claim 2 wherein the acrylic polymer particles have a calculated $T_g$ in the range of from −10° C. to 20° C., and comprise structural units of methyl methacrylate and one or more monomers selected from the group consisting of ethyl acrylate, butyl acrylate, 2-ethylhexyl acrylate, and 2-propylheptyl acrylate; and wherein the composition has a Brookfield viscosity in the range of from 1,000,000 cP to 10,000,000 cP.

4. The composition of claim 3 wherein the acrylic polymer particles further comprise structural units of phosphoethyl methacrylate.

5. The composition of claim 2 which further comprises from 150 to 1500 repeat units of a polyethylene or polypropylene wax, wherein the weight-to-weight ratio of the polyethylene or polypropylene wax to the paraffin wax is in the range of from 5 to 35 weight percent, based on the weight of the paraffin wax and the polyethylene or the polypropylene wax.

6. The composition of claim 3 which further comprises from 150 to 1500 repeat units of a polyethylene wax, wherein the weight-to-weight ratio of the polyethylene wax to the paraffin wax is in the range of from 5 to 35 weight percent, based on the weight of the paraffin wax and the polyethylene wax.

7. The composition of claim 3 wherein the extender particles are calcium carbonate particles.

8. The composition of claim 1 which comprises less than 5 PVC levels of an opacifying pigment.

9. The composition of claim 2 wherein the polymer particles have a number average molecular weight in the range of from 10,000 to 40,000 g/mol.

10. The composition of claim 1 which further comprises potato starch.

* * * * *